(12) United States Patent
Kott et al.

(10) Patent No.: US 7,694,767 B2
(45) Date of Patent: Apr. 13, 2010

(54) SYSTEM ELEMENT FOR THE TRANSPORTING AND POSITIONING OF TOOLS

(75) Inventors: Horst Kott, Hamburg (DE); Manfred Bergunde, Rosengarten (DE)

(73) Assignee: Airbus Deutschland GmbH, Hamburg (DE)

( * ) Notice: Subject to any disclaimer, the term of this patent is extended or adjusted under 35 U.S.C. 154(b) by 683 days.

(21) Appl. No.: 11/672,322

(22) Filed: Feb. 7, 2007

(65) Prior Publication Data

US 2007/0200283 A1    Aug. 30, 2007

Related U.S. Application Data

(60) Provisional application No. 60/771,196, filed on Feb. 7, 2006.

(30) Foreign Application Priority Data

Feb. 7, 2006    (DE) .................... 10 2006 005 524

(51) Int. Cl.
    *B60B 39/00*    (2006.01)

(52) U.S. Cl. ..................................... 180/164
(58) Field of Classification Search ............... 180/9.32, 180/164, 901; 414/10; 901/1
See application file for complete search history.

(56) References Cited

U.S. PATENT DOCUMENTS 1,592,654 A * 7/1926 Bremer ..................... 180/9.32

FOREIGN PATENT DOCUMENTS

DE    2647070    4/1977

* cited by examiner

*Primary Examiner*—Stephen Gordon
(74) *Attorney, Agent, or Firm*—Christopher Paradies; Fowler White Boggs P.A.

(57)    ABSTRACT

A system element for the transporting and positioning of a tool on a surface of a workpiece, includes at least one suction device that generates a suction stream, and a transport device that is arranged around the suction device, and includes: at least two rollers that are rotatably supported on the suction device, connection elements that interconnect respective end regions of various rollers, and the rollers and the connection elements are elastically deformable, and when there is a suction stream, the system element substantially conforms with the surface of the workpiece.

8 Claims, 2 Drawing Sheets

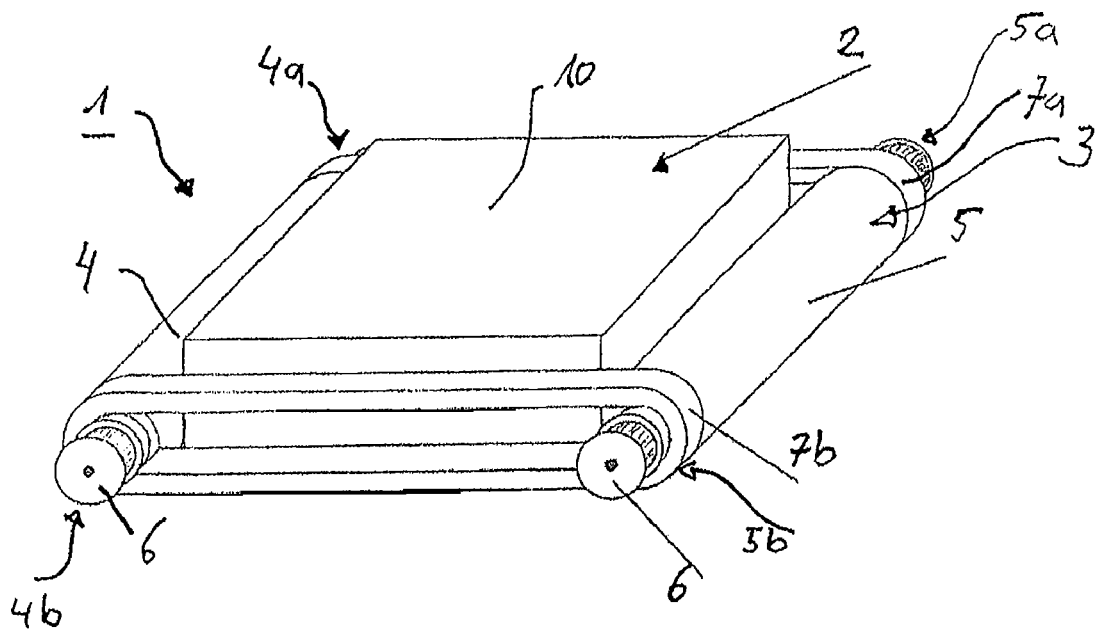
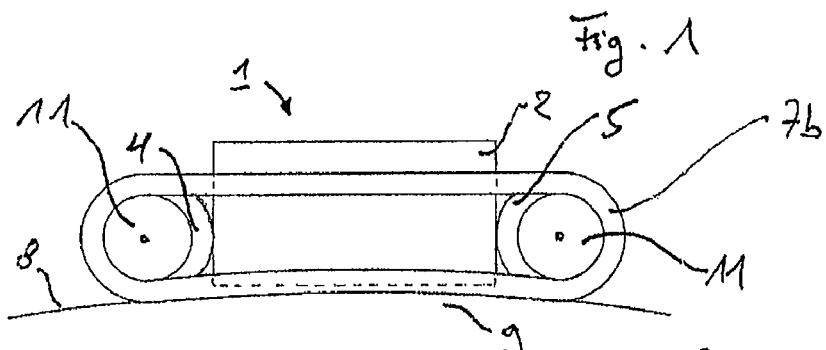
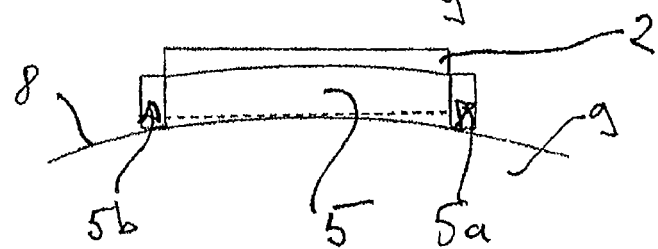

SYSTEM ELEMENT FOR THE TRANSPORTING AND POSITIONING OF TOOLS

REFERENCE TO RELATED APPLICATIONS

This application claims the benefit of the filing date of German Patent Application No. 10 2006 005 524.1 filed Feb. 7, 2006 and of U.S. Provisional Patent Application No. 60/771,196 filed Feb. 7, 2006, the disclosures of which applications are hereby incorporated herein by reference.

FIELD OF THE INVENTION

The field relates to a system element for the transporting and positioning of a tool on a surface of a workpiece.

BACKGROUND OF THE INVENTION

In order to use robots for machining large workpieces, it may be economical to rigidly position the workpiece and to let the robot move to the position where machining is to occur. If the dimension of the robot is to be kept small, the robot may be moved to a suitable position. If the workpiece is sufficiently stable, there may be no need to use external devices for leading the robot into position, for example, for scaffolds, provided the technical task of moving over the workpiece is solved. This may involve the sub-task of locomotion and, if the surface is inclined, of adhesion.

In order to achieve adhesion to the surface, the solution of providing the transport and positioning device with one or several suction cups suggests itself. This approach may be associated with some problems of implementing locomotion. For example, a window cleaning robot adheres to the window panes by means of suction cups. In the case of a window cleaning robot, a sliding suction function may be achieved. In order to combine good sealing characteristics with good sliding characteristics, in this arrangement, a liquid is injected between the suction cup and the window pane surface.

The known window cleaning robot may be designed for operating on substantially non-curved glass panes since, depending on the radius of curvature of the surface, significant limits apply to the size of the suction cups and thus to the contact pressure. Furthermore, it may be undesirable in use to put up with regular feed-in and the release of liquid.

SUMMARY OF THE INVENTION

Among other things, it may be an object to create an option for safely transporting and positioning a tool, in particular, on an inclined or curved surface of a workpiece.

In one example, a system element for the transporting and positioning of a tool on a surface of a workpiece, comprises at least one suction device that generates a suction stream, and a transport device that is arranged around the suction device, wherein the transport device comprises: at least two rollers that are rotatably supported on the suction device, and connection elements that interconnect respective end regions of various rollers, the rollers and the connection elements being elastically deformable, and when there is a suction stream, the system element substantially conforms with the surface of the workpiece.

According to one embodiment of the system element, the rollers and the connection elements contact lateral walls of the suction device, as a result of which between a suction side of the suction device, the rollers, and the connection elements, strong negative pressure may be generated as a result of the suction stream, and the system element may be safely held to the surface of the workpiece.

According to one embodiment of the system element, advance of the system element may be taken place by a torque applied to at least one of the rollers, as a result of which the system element and correspondingly, a tool coupled to the system element may be transported and positioned on the surface of the workpiece in an easy manner without the surface being damaged.

According to one embodiment of the system element, at least one connection element is formed as a running belt that interconnects two rollers by their end regions, wherein, at least on one of the end regions of the rollers, pulleys are arranged, which are rigidly connected to the rollers, with the running belt being placed around the pulleys, for the purpose of transmitting the torque to the rollers. As an alternative, the rollers may idle, with forward movement of the system element taking place solely by way of the running belts.

As an alternative, the connection element may be designed as a roller, which is, capable of been driven such by a motor that the mobility of the system element is enhanced.

According to one embodiment of the system element, a surface of the suction device that is defined by the lateral walls of the suction device and that faces away from the suction side of the suction device is designed so as to be quadrangular, and in each case, one roller is arranged on two opposite lateral walls, wherein the end regions of the rollers are connected to each other by way of a running belt. As an alternative, any desired forms of the suction device include various forms such as triangular, trapezoidal, etc., wherein any number of rollers and corresponding connection elements are provided on the respective lateral walls.

Several system elements may be combined to form a transport system, wherein the system elements are connected to each other so that large tools may be transported that may be coupled to the transport system.

The system element for transporting and positioning a tool on a curved surface of a workpiece operates with one or several suction devices which hereinafter are also referred to as "suction chambers," which roll over the surface instead of gliding over it, so that friction may be drastically reduced.

In forward and reverse direction, a suction chamber rolls, for example, on flexible rollers that conform to the surface curvature of the workpiece under the effect of the air pressure and of a suction stream generated by the suction chamber, until the suction stream ceases and further movement may be possible while rolling and without loss of negative pressure.

The lateral surfaces of the suction chamber finish off with flexible running belts, which as a result of air pressure and suction stream conform both to the curved surface and to the suction chamber.

In this way, sliding friction may be shifted from contact with the workpiece to contact with the suction chamber so that by way of a suitable selection of the suction-chamber wall material, or by way of movable parts on the suction-chamber wall, sliding friction may be significantly reduced.

The advance of the suction chamber may, for example, be handled by the rollers or by the running belts.

For the rollers, depending on requirements of torque transmission, a single flexible material may be sufficient; a material combination made of a flexible envelope and a flexible but torsionally relatively stiff core may be advisable, or a core made from a chain of universal joints with longitudinal compensation might be the right solution.

For the running belts various profiles and designs may be considered, depending on whether the drive belts at the same time also assume the function of drive belts (torque transmission from a motor to the rollers), or on whether the drive belts are to be integrated in the running belts, whether they are externally coupled to the drive belts or whether they run along independently of the drive belts, for sealing purposes only.

In addition to the above-mentioned elements, near the contact positions between sealing parts and the suction chamber, airstream-reducing parts (e.g. pads made of fabric or sponge material) may be installed, which do not result in any significant friction but which in case of a leak clearly may reduce the speed of negative-pressure loss, and in this way may allow for a vacuum pump that communicates with the suction chamber to maintain adequate negative pressure.

Due to the flexibility of the rollers and the running belts, good adaptation to curved surfaces and at the same time good sealing may be made possible. Under the effect of the air pressure and the air stream, the system may automatically conform with the surface of a workpiece, wherein such conforming may not have to be ensured by separate control units.

Furthermore, if the curvature of the surface of the workpiece is not extreme, the base surface of a suction chamber (suction device) that may be provided may be large, the large surface may be an advantage, particularly in applications in aircraft construction, because in this industry sector, large parts have to be transported and positioned.

Furthermore, no wetting of the workpiece using sealing fluids or sliding fluids may be required. By shifting the principal friction to targeted contact surfaces with the suction device, friction may be minimised by optimising materials and the nature of the surface. The contact surfaces are, for example, strip-shaped. Furthermore, as a result of the rolling movement, the surface of the workpiece may be exposed to minimal stress.

According to one embodiment, for the purpose of locomotion of the system element, contact with the workpiece surface may not need cease; in other words, there may no need to cease negative pressure and then to build it up anew.

BRIEF DESCRIPTION OF THE FIGURES

Below, with reference to the enclosed drawings, preferred embodiments are described. In the drawings:

FIG. 1 shows a diagrammatic perspective view of a system element according to the preferred embodiment;

FIG. 2 shows a diagrammatic lateral view of the system element according to FIG. 1;

FIG. 3 shows a diagrammatic front view of the system element according to FIG. 1.

DETAILED DESCRIPTION

Figure 4:
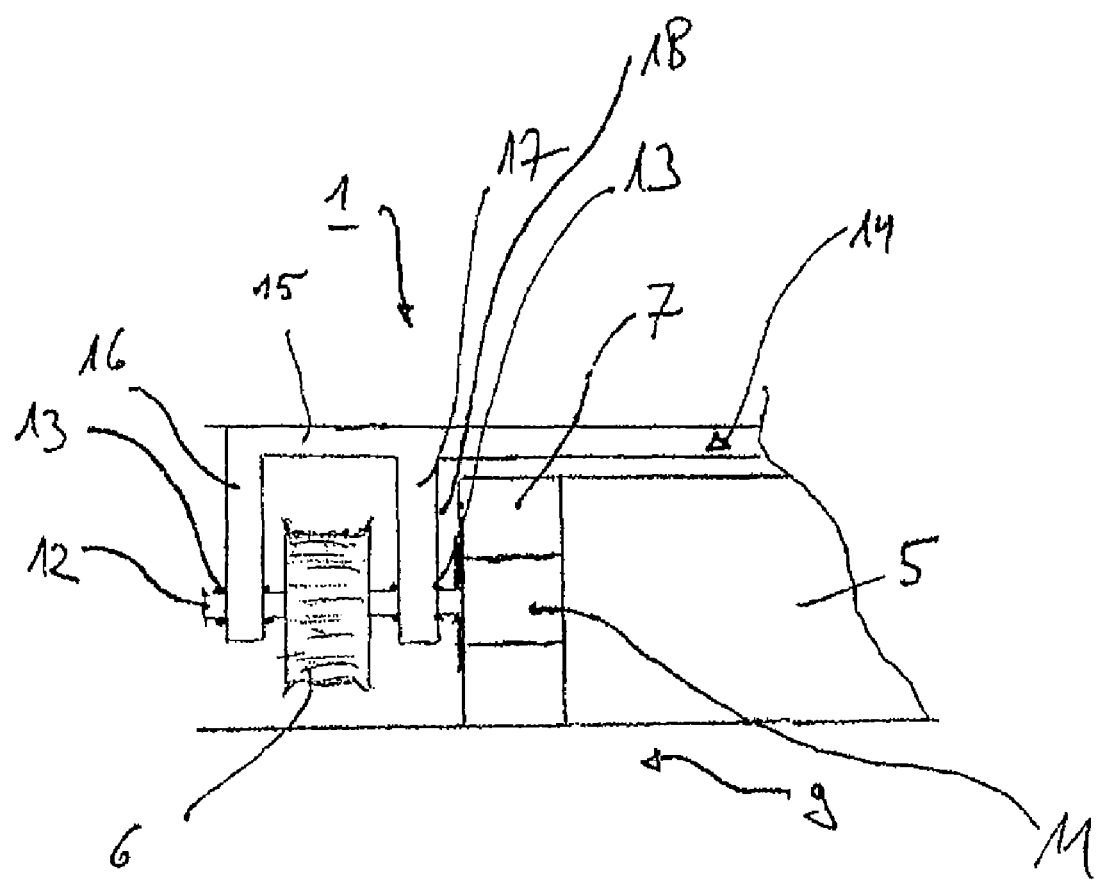
FIG. 4 shows a diagrammatic partial lateral view of a detail of the system element according to FIG. 1.

The examples described and drawings rendered are illustrative and are not to be read as limiting the scope of the invention as it is defined by the appended claims.

Below, the same reference characters are used for identical components in the different views of the figures. The illustrations in the figures are diagrammatic and not to scale.

In FIG. 1, the system element 1 comprises a suction chamber 2 which is used for generating a suction stream and which is a generally known component, known by a person of ordinary skill in the art. The system element 1 further comprises a transport device 3 that encloses lateral walls of the suction chamber 2.

As shown in FIG. 1, the transport device 3 comprises a first roller 4 and a second roller 5, where the rollers are arranged at opposite lateral surfaces of the suction chamber 2 and contact the respective lateral surface.

According to the embodiment, pulleys 6 for driving the rollers 4, 5 and thus for driving the system element 1 are arranged on the respective end regions 4a, b and 5a, b of the first and second rollers 4, 5. The pulley 6 and the rollers 4, 5 are firmly connected to an axle 12, as shown in FIG. 4, so that the running belt 7 is not subjected to unnecessary deformation as a result of torque transmission, but may instead carry out its sealing function without hindrance. As an alternative, a drive belt (not shown), may be used and is driven by a motor (not shown) and is connected to the pulley 6, to drive the running belt 7, such that a torque acts on the rollers 4, 5, and so that the system element may be moved.

According to the embodiment, the suction chamber 2 is supported by the rollers 4, 5 such that rotation of the rollers 4, 5 may be possible and the suction chamber 2 may be safely held to the rollers 4, 5.

According to the embodiment, the running belt 7 is made from a flexible material so that the running belt 7 may carry out its sealing function. As shown in FIG. 1, the embodiment comprises two running belts 7a, 7b that may establish contact with opposite lateral surfaces of the suction chamber 2, where the lateral surfaces are not the same as the lateral surfaces that are contacted by the rollers 4, 5.

As shown in FIG. 1, the end regions 4a, 5a of the rollers 4, 5 are connected by way of the running belt 7a, and the end regions 4b, 5b of the rollers 4, 5 are connected to each other by a separate running belt 7b. Both belts are examples of a connection element.

With reference to FIGS. 2 and 3, the function of the system element 1 according to FIG. 1 is described.

FIG. 2 shows a diagrammatic lateral view of the system element, according to FIG. 1, in a state in which the suction chamber 2 generates a suction stream, wherein the system element 1 is sucked to a surface 8 of a workpiece 9. As shown in FIG. 2, in this suction state, the flexible running belt 7b (and the running belt 7a that is not visible in this view) conforms to the curved surface 8 of the workpiece 9. FIG. 2 shows guide discs 11 around where the running belt 7b has been placed.

FIG. 3 shows a front view of the sucked in system element, according to FIG. 2. The diagram shows that in the sucked in state, the running belts 7a, b may conform with the surface 8 of the workpiece 9, and that the rollers 4, 5 may be made from a correspondingly elastic flexible material.

FIG. 4 shows a diagrammatic partial lateral view of a detail of the system element 1 according to FIG. 1.

As shown in FIG. 4, the running belt 7 is placed around a guide disc 11. The guide disc 11 is connected to an axle 12 which extends from the roller 5 towards the outside. By way of a sliding bearing or ball bearing 13, a connection 14 is supported by the axle 12. The connection 14 is preferably rigid and bears or supports the suction chamber (not shown).

According to the preferred embodiment, the rigid connection 14 comprises a first part 15, that extends so as to be substantially parallel in relation to the axle 12 and the roller 5, and a second part 16 and a third part 17 which extend substantially perpendicularly from the first part 15 in the direction of the axle 12. The free ends of the first and second parts 16, 17 are supported by the axle 12 via the sliding bearings or ball bearings 13.

The first and second parts 16, 17 of the connection 14 are spaced apart from each other, and the pulley 6 is arranged between the first part 16 and the second part 17, as shown in FIG. 4.

During the transport of the suction chamber 2 over the workpiece 9, the suction device 2 is supported by the rollers 4, 5. To this effect, the axle bearing 12 of the rollers 4, 5 is rigidly connected to the suction chamber 2 as described above. Expediently, attachment of the axle bearing 12 is further to the outside than the position of the running belts 7 such that the axle bearing arrangement may not be in the way of automatic sealing between the running belts 7 and the rollers 4, 5. The rigid connection 14 of the axle bearings 12 and the suction chamber 2 comprises an opening 18, through which the upper part of the running belts 7 may move.

In an inoperative position, e.g. while a transported tool is in operation, attachment of the suction device may also be possible by way of additional suction cups or by way of full contact of the suction device in that the rigid connection to the rollers is undone.

Thus, the running belts 7a, 7b, which may serve as connection elements, and the rollers 4, 5, which may serve to generate forward movement of the system element 1, may conform to the curved surface 8 of the workpiece 9 when the suction chamber 2 generates a suction stream, so that a good negative pressure is generated between the suction chamber 2 and the surface 8 of the workpiece 9, where negative pressure makes possible reliable adhesion of the system element 1 to the surface 8 of the workpiece 9. In this way a tool (not shown) that is coupled in any desired manner to the system element may reliably be conveyed to a desired position on the surface of the workpiece 9, where the tool may be positioned.

Although not shown in the figures, a transport system according to the invention may comprise a plurality of system elements 1.

For example, the shape of the suction chamber 2 is not limited to a square or rectangular shape but instead may comprise any form with any number of lateral surfaces, but it may be ensured that each lateral surface is contacted either by a roller or by a running belt so as to ensure that adequate negative pressure is generated for adhesion of the system element 1.

Furthermore, the running belt 7 may also be designed as some other connection element that interconnects the end regions of the rollers and contacts a lateral surface of the suction chamber 2. In this case, the drive of the system element 1 takes place by applying a torque to any one of the rollers 4, 5 (or to both) without the need for pulleys 6.

As an alternative, the running belts 7 may be made from a suitable material and may have a suitable shape so that forward movement of the system element may by said running belts 7 alone, wherein the rollers 4, 5 are idle rollers.

The system element may be used in many sectors, for example, in aircraft construction, shipbuilding or in any other sectors where a tool has to be reliably transported over a curved surface of a workpiece and has to be positioned thereon, wherein the term "tool" also refers to a component, robot or a workpiece to be transported.

Furthermore, the system element may of course also be used on horizontal or flat surfaces.

It should also be mentioned that "comprising" does not exclude any other elements or steps, and that "a" or "an" does not exclude a plurality. It should furthermore be noted that characteristics or steps described with reference to one of the above embodiments may also be used in combination with other characteristics or steps of other above-described embodiments. The reference symbols in the claims should not be understood in a restrictive sense.

Alternative combinations and variations of the examples provided will become apparent based on this disclosure. It is not possible to provide specific examples for all of the many possible combinations and variations of the embodiments described, but such combinations and variations may be claims that eventually issue.

LIST OF REFERENCE CHARACTERS

| | |
|---|---|
| 1 | System element |
| 2 | Suction chamber |
| 3 | Transport device |
| 4 | First roller |
| 5 | Second roller |
| 4a, b | End regions of the roller 4 |
| 5a, b | End regions of the roller 5 |
| 6 | Pulley |
| 7 | Running belt |
| 8 | Surface of the workpiece |
| 9 | Workpiece |
| 10 | Surface of the suction chamber |
| 11 | Guide disc |
| 12 | Axle |
| 13 | Sliding bearing/ball bearing |
| 14 | Rigid connection |
| 15 | First part |
| 16, 17 | Second and third part |
| 18 | Opening |

What is claimed is:

1. A system element for the transporting and positioning of a tool on a surface of a workpiece, comprising
at least one suction device that generates a suction stream; and
a transport device that is arranged around the suction device, the transport device having at least two rollers that are rotatably supported on the suction device, and connection elements that interconnect end regions of the rollers; wherein the rollers and the connection elements are elastically deformable, and the system element substantially conforming with the surface of the workpiece where there is a suction stream.

2. The system element of claim 1, wherein the rollers and the connection elements contact lateral walls of the suction device.

3. The system element of claim 1, wherein an advance of the system element takes place by a torque applied to at least one of the rollers.

4. The system element of claim 1, wherein at least one of the connection elements designed as a running belt that connects two of the rollers at the end regions of the two rollers.

5. The system element of claim 4, wherein pulleys are arranged at least on one of the end regions of the rollers, the pulleys being rigidly connected to the rollers, and the running belt being placed around the pulleys for transmitting a torque to the rollers.

6. The system element of claim 4, wherein a torque is applied directly to at least one axle of the rollers or to at least one running belt or both.

7. The system element of claim 1, wherein a surface of the suction device that is defined by opposite lateral walls of the suction device and that faces away from a suction side of the suction device, is formed quadrangular,
wherein one of the rollers is arranged on the opposite lateral walls of the suction device, and
the end regions of the rollers are connected to each other by a running belt.

8. A transport system comprising a plurality of system elements of claim 1.

* * * * *